No. 652,003. Patented June 19, 1900.
W. KINGSLAND.
ELECTRIC RAILWAY.
(Application filed Sept. 8, 1899.)
(No Model.) 3 Sheets—Sheet 1.
FIG: 1.
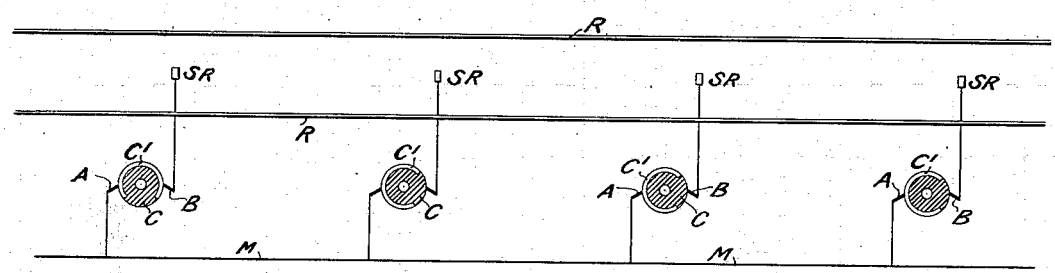
FIG: 5. FIG: 6.
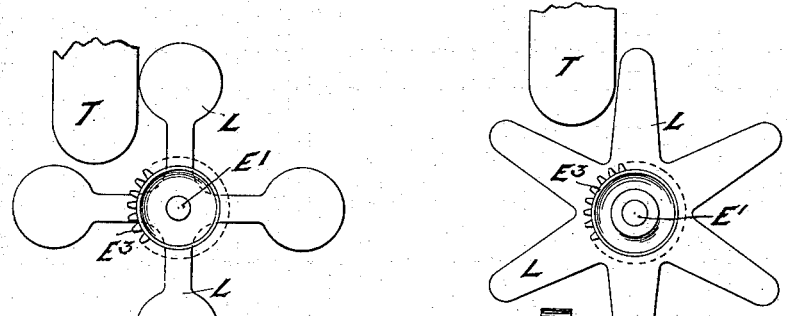
FIG: 4.
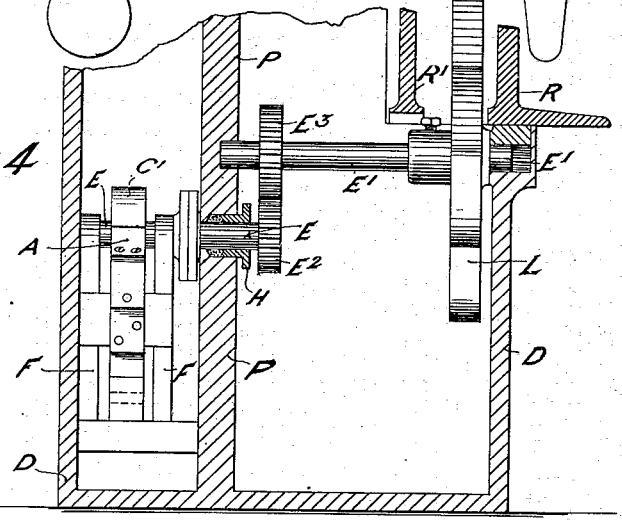
Witnesses
Chas H Smith
J. Staib
Inventor
William Kingsland
per L. W. Serrell & Son
Attys
THE NORRIS PETERS CO., PHOTO-LITHO., WASHINGTON, D. C.

No. 652,003. Patented June 19, 1900.
W. KINGSLAND.
ELECTRIC RAILWAY.
(Application filed Sept. 8, 1899.)
(No Model.) 3 Sheets—Sheet 2.
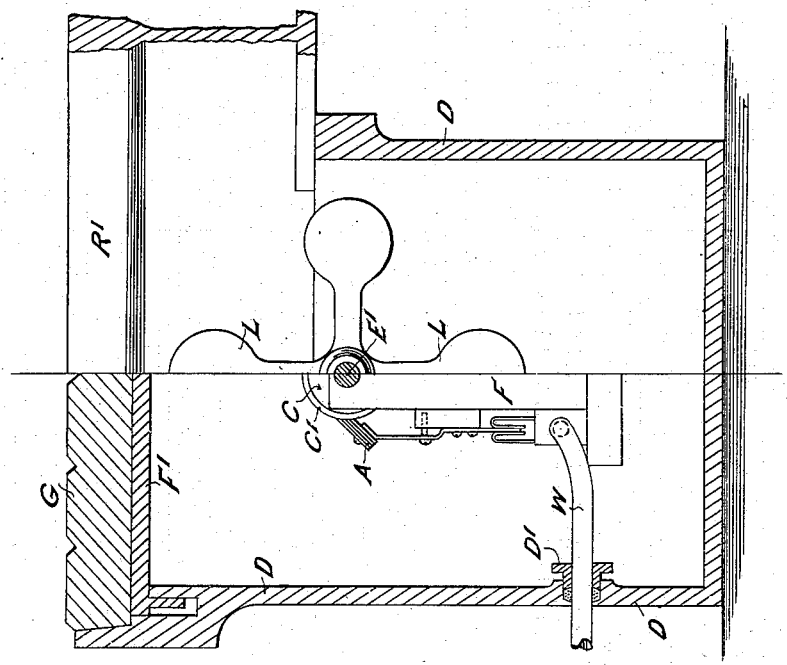
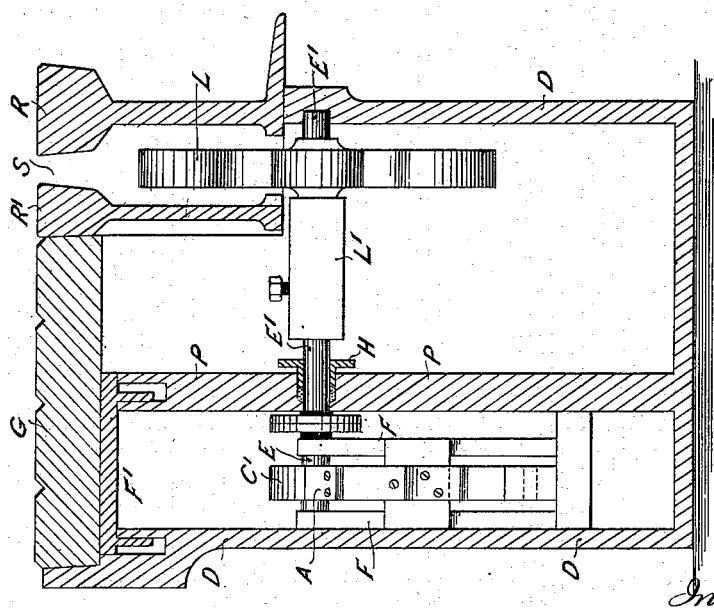
Witnesses
Chas H. Smith
J. Staib
Inventor
William Kingsland
per L. W. Serrell & Son
Attys No. 652,003. Patented June 19, 1900.
W. KINGSLAND.
ELECTRIC RAILWAY.
(Application filed Sept. 8, 1899.)
(No Model.) 3 Sheets—Sheet 3.
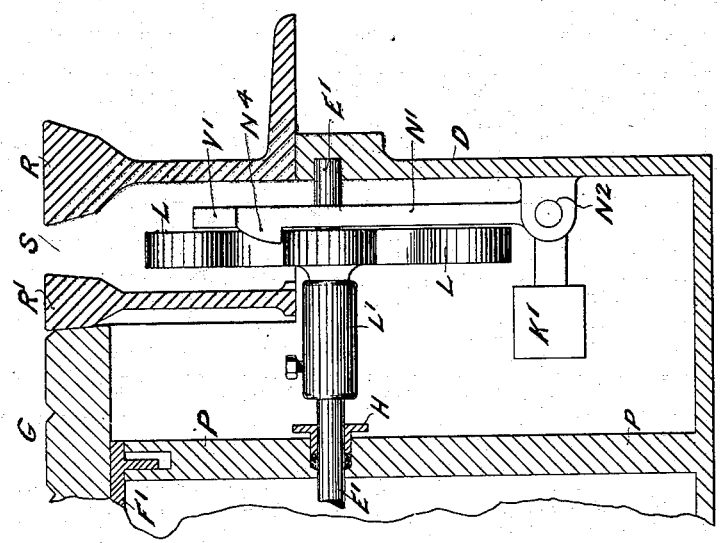
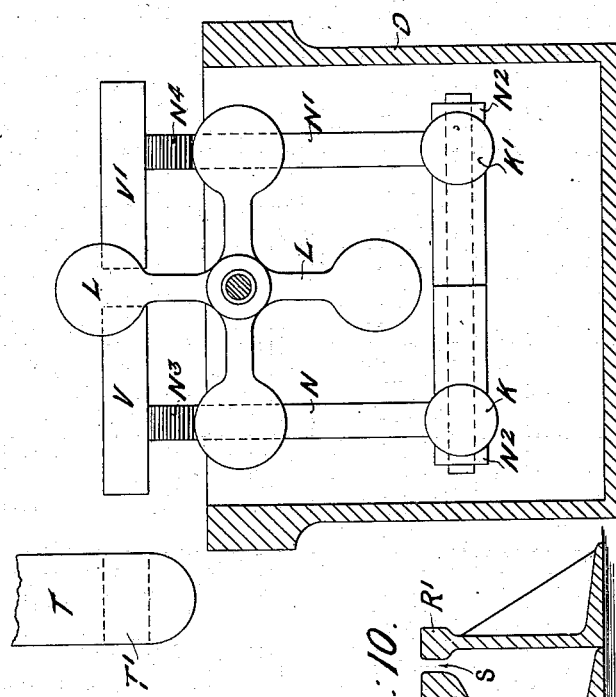
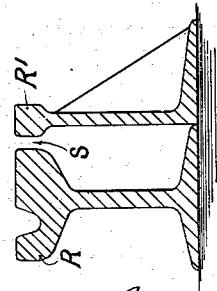
Witnesses
Chas H Smith
J. Staib
Inventor
William Kingsland
per L. W. Serrell & Son
attys
THE NORRIS PETERS CO., PHOTO-LITHO., WASHINGTON, D. C.

UNITED STATES PATENT OFFICE.

WILLIAM KINGSLAND, OF LONDON, ENGLAND.

ELECTRIC RAILWAY.

SPECIFICATION forming part of Letters Patent No. 652,003, dated June 19, 1900.

Application filed September 8, 1899. Serial No. 729,813. (No model.)

*To all whom it may concern:*

Be it known that I, WILLIAM KINGSLAND, a subject of the Queen of Great Britain, residing at London, England, have invented certain new and useful Improvements in or Connected with Electrical Traction, (for which I have made application for British Patent No. 4,210, dated February 25, 1899,) of which the following is a specification.

In the United States Letters Patent No. 592,056, dated October 19, 1897, granted to me for improvements in and connected with electrical traction, I have described and illustrated a form of apparatus or switch for connecting and disconnecting from a main conductor the successive sectional working conductors, which latter are sometimes employed in a system of electrical traction more generally known as the "surface-contact" system. The switch mechanism as described in the aforesaid Letters Patent necessitates the use in conjunction therewith of "sectional auxiliary conductors," joining each switch with the preceding or succeeding switch, respectively. In the invention herein described I am able to dispense with the use of these sectional auxiliary conductors and to effect the immediate and separate connection and disconnection of the main conductor from the sectional working conductors, and I have made certain improvements in the arrangement and combination of the switch mechanism, as hereinafter stated.

This invention therefore refers to improvements in and connected with that system of electrical traction wherein the electric current is conveyed from a main conductor to the moving vehicle through the medium of sectional conductors or "sectional rails," which latter are successively connected and disconnected from the main conductor by the passing vehicle, which makes electrical contact with the successive sections as it passes along the track, and my invention particularly refers to the combinations and arrangements of parts by which the connection and disconnection of the main conductor from the sectional conductors are effected.

My invention is more particularly set forth and illustrated in the accompanying drawings, in which—

Figure 1 is a diagrammatic view of the conductors and their connections. Fig. 2 is an end sectional elevation showing the switch apparatus, the containing-box, and the rail-slot. Fig. 3 is a front elevation, in half-section, of same. Fig. 4 is a part end sectional elevation similar to that shown at Fig. 2, but illustrating a slightly-different arrangement of the mechanism. Fig. 5 shows one form of rotating-lever appliance for operating the switches, and Fig. 6 shows another form. Figs. 7, 8, and 9 are respectively a front sectional elevation, a side sectional elevation, and a plan showing a form of locking apparatus for the rotating lever. Fig. 10 is an end sectional elevation of an arrangement of rails forming the rail-slot.

According to my invention I provide a rotatable cylindrical commutator-switch C, Figs. 1 and 3, of some suitable insulating material, and I cover one portion of the circumference of the cylinder with a conducting metal plate C'. The rotatable commutator-switch C is mounted on a spindle E and is free to rotate in either direction. It is further supported on a suitable frame F, Figs. 2 and 3, preferably made of insulating material. Pressing against the cylinder at two separate points I provide two contact springs or brushes A and B, one of these being in electrical connection with the main conductor M, Fig. 1, and the other with a sectional conductor or contact-stud S R. When, therefore, the switch is in such a position that the metal plate C' thereon is touching both pressure-contacts A and B, the current can pass, by means of the metal plate, from the main conductor M to that sectional conductor S R which is in connection with the particular switch in question; but if the switch be partially turned on its axis one or both of the pressure-contacts A B may no longer be touching the metal plate C', but may rest on the insulating portion of the cylinder C, and therefore the electrical connection between the main conductor M and the sectional conductor S R will be broken.

Let it be supposed that the metal plate C' extends half-way around the cylinder C, (or rather more than half-way, as in Fig. 1,) so as to connect the two pressure-contacts A B, placed at opposite points of a diameter. It is obvious that if the switch be turned half around the pressure-contacts A B will again be electrically connected by the metal plate C'; but if it be turned one-quarter one of the pressure-contacts will rest on the insulating portion of the cylinder, so that in one complete revolution of the switch there will be two positions in which the contacts A and B will be electrically connected and two in which they will be disconnected. It is not, however, essential that there should be two "on" and two "off" positions in one complete revolution of the switch, as it is obvious that the contact-brushes and metal part of the revolving switch may be so arranged that there might be one, two, three, or several on and the same number of off positions; but it is essential that the successive positions of the switch should be alternately on and off. By such an arrangement of switch I am enabled to obtain improved contact and insulation and this without causing the current to pass through a number of loose parts, as previously known.

The main and sectional conductors, in combination with the switch, as herein described, may be used for one direction of current only, the rails, as in most cases, serving to convey the return-current, or a double set may be used for lead and return.

In order that the rotatable commutator-switch may be operated by a vehicle, I provide the various parts and contrivances, as will now be described.

S, Fig. 2, is a slot in or contiguous to one of the rails R upon which the vehicles run, and this slot may occupy the place of the ordinary groove in the rail, as in Fig. 2, or the slot S may be formed as illustrated at Fig. 10, wherein an ordinary tram-rail R is employed, and the slot S is formed by arranging a second rail R' on one side of the tram-rail R. The slot ordinarily extends to the depth of the rail. Projecting up from below into the slot is a rotating-lever appliance L, having four or more arms, as illustrated in Figs. 5 and 6. The spindle E', which carries these arms, has a coupling at L', Fig. 2, which enables it to be mounted or dismounted, whereby the tappet-lever may be removed for inspection or repair quite independently of the other parts. The flange of the rail is partly cut away to accommodate the lever L.

D is a metal box, preferably of cast-iron, divided into two compartments by the partition P and having a removable cover G. One compartment of the box contains the rotatable commutator-switch and is made water-tight by the cover F'. The connecting wires or cables for the contacts A and B also pass into this compartment of the box through water-tight glands—as, for example, is shown at Fig. 3, where W is one of the wires electrically connected to the contact A and passing out of the box D by the packed gland D'. The other compartment of the box D, which is not water-tight, and consequently should be suitably drained, has its upper side and end parts cut away sufficiently to allow of the passage of the rails R R'. This compartment of the box serves to inclose the tappet-lever L, which extends into the slot S between the rails R R', and the spindle E', which carries the lever-arms, passes through a gland H into the compartment containing the switch and is there coupled, as shown at Figs. 2 and 3, direct to the switch-spindle E.

In order that the rotating lever may be operated by a vehicle, I cause the said vehicle to carry two striking-bars which project down into the slot S, Fig. 2, and engage with whichever lever-arm L happens to be in a vertical position. One of these striking-bars is arranged at the forward end of the vehicle and the other at the rear end. The action will then be as follows: The switch being in its normal or off position, the action of the forward striking-bar on the vehicle will be to place it at its on position, while the rear striking-bar acting on the next arm of the lever will place the switch at its next or off position. If the car is reversed, the rear striking-bar becomes the forward one and will have the effect of placing the switch at the on position. The striking-bars may be of any convenient size or shape, but preferably somewhat flat and with rounded ends, as shown at T, Figs. 5 and 6.

In some cases, and especially when it is desired that the radial movement of the lever-arms should be less or even greater than the movement of the cylinder C, I couple the switch-shaft E to the lever-shaft E' by means of gearing—as, for example, is shown at Fig. 4—instead of directly connecting the two shafts E and A together, as shown at Figs. 2 and 3.

At Fig. 4 a spur-wheel $E^2$ is fixed on the shaft E, as is also shown at Figs. 5 and 6, and this spur-wheel $E^2$ gears with a spur-wheel $E^3$ on the shaft E', so that any motion of the one shaft will be communicated to the other in any desired ratio.

When the rotating lever has only four arms, it is advisable to furnish them with enlarged ends, as shown in Fig. 5, as by this means the arms may be placed in a correct vertical and horizontal position whichever way the vehicle may be going.

To protect the levers L from accidental or wanton displacement, I provide the locking arrangement shown in Figs. 7, 8, and 9, where N and N' are two lever-catches hinged at $N^2$ to the side of the box D and having counter-weights K K' on arms at right angles to the lever-catches N N', so as to keep the latter normally in a forward position. At the top ends of the two levers N N' are two curved striking-plates V V' and immediately below them two catches $N^3$ and $N^4$. These two catches $N^3$ $N^4$ engage with the upper surface of the two horizontal arms of the rotating lever L, and thus normally prevent it from being turned. The two levers N and N' work independently of each other. The striking-bar T, a portion of which is shown at Figs. 7 and 9, is provided with a projection T', Fig. 9, and this projection operates on the striking-plates V and V' and causes them to be pushed back, thus releasing the lever L from the catches $N^3$ and $N^4$. As soon as the striking-bar T has passed the levers N N' will fall forward into their normal locking position, as shown, under the action of the counterweights K K'. The same arrangement may be applied to any two of the arms of a rotating lever having more than four arms.

What I claim as my invention, and desire to secure by Letters Patent, is—

1. In the surface-contact system of electric traction wherein the electric current is transmitted from a main conductor to the moving vehicle through sectional conductors, successively connected and disconnected to and from the mains by the passing vehicle, which is in electrical contact with the sections as it passes along the track: the combination with a box formed with two compartments, the first compartment being made water-tight, to contain an axially-revoluble switch-cylinder C with conducting and insulating surfaces on its circular periphery, and a frame carrying brushes A B in contact with the cylinder, one brush being in connection with the electrical main and the other with the sectional conductor, a revoluble shaft carrying the cylinder and passing through the partition to the second compartment, and a four or more armed tappet-lever fixed on the cylinder-shaft in the second compartment, the upper part of the walls of the latter being cut away above the tappet-lever: of track-rails having an open channel between same passing over the cut-away part of the second compartment, the arms of the tappet-lever extending into such channel between the rails, and a front and rear tappet-piece on each motor-vehicle, which tappet-pieces act consecutively upon the arms of the tappet-lever to give step-by-step rotative motions to the shaft and thereby to the cylindrical switch, substantially as set forth.

2. In electrical traction, the combination with a main electrical conductor, and sectional working conductors from which the motor-vehicle directly collects the current, a switch mechanism located between the main and each of the sectional conductors, such switch mechanism consisting of a shaft mounted in bearings, a four or more armed tappet-lever carried on the shaft, a cylinder having conducting and insulating surfaces also mounted on the same shaft, two brushes in contact with the cylinder, one in electrical connection with the main conductor and the other in connection with one of the sectional conductors; of a locking device, consisting of two lever-catches hinged to a fixed part, counterbalancing-arms to cause the lever-catches to normally engage with the arms of the tappet-lever, a curved striking-plate on the upper end of each lever-catch, tappet-pieces on each motor-vehicle to force back the catch-levers, to free the tappet-lever and partially rotate same, the latter lever being again locked automatically by the falling forward of the catch-levers substantially as set forth.

3. In electrical traction, the combination with a main electrical conductor and sectional working conductors from which the motor-vehicle directly collects the current; of a switch mechanism located between the main and each sectional conductor, such switch mechanism consisting of a rotary shaft carried in bearings, a cylinder having conducting and insulating surfaces mounted on the shaft, two brushes in contact with the cylinder, one in electrical connection with the main conductor, and the other in connection with one of the sectional conductors, an inclosing box having a water-tight compartment therein to receive the rotary shaft and parts connected therewith, an extension of the rotary shaft into a second compartment of the box, a four or more armed tappet-lever carried on the shaft in the second compartment, rails above the box arranged to form a slotted conduit into which the armed tappet-lever projects, two lever-catches hinged to the box and counterbalanced arms on the catches to cause same to normally and automatically engage and lock the armed tappet-lever, and tappet-pieces on each motor-vehicle to force back the catch-levers and release and partially rotate the armed tappet-lever, the latter lever being again locked automatically by the falling forward of the catch-levers after the passing of the vehicle-tappets as set forth.

WILLIAM KINGSLAND.

Witnesses:
 E. G. BREWER,
 W. A. MARSHALL.